(12) United States Patent
Xu

(10) Patent No.: US 10,915,646 B2
(45) Date of Patent: Feb. 9, 2021

(54) METHOD AND APPARATUS FOR NETWORK SECURE STORAGE

(71) Applicant: TENCENT TECHNOLOGY (SHENZHEN) COMPANY LIMITED, Shenzhen (CN)

(72) Inventor: Huarong Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 235 days.

(21) Appl. No.: 15/728,332

(22) Filed: Oct. 9, 2017

(65) Prior Publication Data

US 2018/0032752 A1    Feb. 1, 2018

Related U.S. Application Data

(63) Continuation of application No. PCT/CN2016/084909, filed on Jun. 6, 2016.

(30) Foreign Application Priority Data

Aug. 28, 2015   (CN) .......................... 2015 1 0542767

(51) Int. Cl.
H04L 29/08       (2006.01)
G06F 21/62       (2013.01)
(Continued)

(52) U.S. Cl.
CPC ........ G06F 21/6218 (2013.01); G06F 3/0604 (2013.01); G06F 3/067 (2013.01);
(Continued)

(58) Field of Classification Search
CPC .... G06F 21/6218; G06F 3/0604; G06F 3/604; G06F 3/0631; G06F 3/067; G06F 21/80; H04L 67/02
See application file for complete search history.

(56) References Cited

U.S. PATENT DOCUMENTS 9,117,061 B1 *   8/2015   Sokolov .................... H04L 9/00
2002/0141584 A1*  10/2002  Razdan ................... G06F 21/10
                                                                  380/203

(Continued)

FOREIGN PATENT DOCUMENTS

| CN | 102375947 A | 3/2012 |
| CN | 102663318 A | 9/2012 |

(Continued)

OTHER PUBLICATIONS

The World Intellectual Property Organization (WIPO) International Search Report for PCT/CN2016/084909 dated Sep. 13, 2016 6 Pages (including translation).

(Continued)

*Primary Examiner* — Beau D Spratt
(74) *Attorney, Agent, or Firm* — Anova Law Group, PLLC

(57) ABSTRACT

This application discloses a method for network secure storage. The method includes: receiving a client request to create a window; creating a window in response to the client request; allocating a storage area for the window; allocating a rendering process to the window; and providing, to the rendering process, a storage service using the storage area.

19 Claims, 6 Drawing Sheets

(51) Int. Cl.
G06F 21/80 (2013.01)
G06F 3/06 (2006.01)
(52) U.S. Cl.
CPC ........... *G06F 3/0631* (2013.01); *G06F 21/80* (2013.01); *H04L 67/02* (2013.01)

(56) References Cited

U.S. PATENT DOCUMENTS

| | | | |
|---|---|---|---|
| 2004/0133563 A1* | 7/2004 | Harvey | H04L 67/42 |
| 2008/0082602 A1* | 4/2008 | Morikawa | H04L 63/105 |
| | | | 709/203 |
| 2012/0066769 A1* | 3/2012 | Latchem | G06F 21/6263 |
| | | | 726/26 |
| 2012/0246592 A1* | 9/2012 | Yeung | G06F 9/445 |
| | | | 715/783 |
| 2012/0260327 A1 | 10/2012 | Lissick | |
| 2012/0304265 A1 | 11/2012 | Richter et al. | |
| 2015/0248347 A1* | 9/2015 | Minematsu | G06F 17/30902 |
| | | | 711/159 |

FOREIGN PATENT DOCUMENTS

| | | |
|---|---|---|
| CN | 102843394 A | 12/2012 |
| CN | 103914456 A | 7/2014 |
| CN | 104239514 A | 12/2014 |
| CN | 104618556 A | 5/2015 |

OTHER PUBLICATIONS

The State Intellectual Property Office of the People's Republic of China (SIPO) Office Action 1 for 201510542767.1 dated Apr. 30, 2019 8 Pages (including translation).

* cited by examiner

US 10,915,646 B2

METHOD AND APPARATUS FOR NETWORK SECURE STORAGE

RELATED APPLICATION

This application is a continuation application of PCT Patent Application No. PCT/CN2016/084909, filed on Jun. 6, 2016, which claims priority to Chinese Patent Application No. 201510542767.1, entitled "METHOD AND APPARATUS FOR NETWORK SECURE STORAGE", filed on Aug. 28, 2015. The priority applications are incorporated by reference in their entirety.

FIELD OF THE TECHNOLOGY

The present disclosure relates to the field of Internet technologies, and in particular, to a method and apparatus for network secure storage.

BACKGROUND OF THE DISCLOSURE

As web page content becomes richer, many web pages are no longer only flat documents, and are more like applications. The change also makes browsers move from only being tools for rendering and displaying documents, to being more like operating systems managing complex applications. For a conventional browser storage services for all rendering processes are implemented in a same storage area. Consequently, a hacker may attack by using data stored in the browser. For example, a hacker may perform a cross-site request forgery (CSRF) attack by using cookies that are temporarily stored in a computer by a server, or perform a cache timing attack by using a cache.

SUMMARY

Technical solutions of the embodiments of the present disclosure are implemented as follows.

One aspect of the present disclosure provides a method for network secure storage, applied to a client browser. The method includes receiving a client request to create a window; creating a window in response to the client request; allocating a storage area for the window; allocating a rendering process to the window; and providing, to the rendering process, a storage service using the storage area.

Another aspect of the present disclosure provides an apparatus for implementing network secure storage. The apparatus includes a window module, configured to: create a window for a client when receiving a request to create the window; allocate a storage area corresponding to the window. The apparatus also includes a rendering process module, configured to: allocate a rendering process corresponding to the window; and provide a storage service to the rendering process by using the storage area.

Another aspect of the present disclosure provides non-transitory computer-readable storage medium containing computer-executable program for, when being executed by a processor, implementing a secure storage method. The method includes: receiving a client request to create a window; creating a window in response to the client request; allocating a storage area for the window; allocating a rendering process to the window; and providing, to the rendering process, a storage service using the storage area.

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are only some of the embodiments of the present disclosure rather than all of the embodiments. All other embodiments obtained by a person of ordinary skill in the art based on the embodiments of the present disclosure without creative efforts shall fall within the protection scope of this application.

Figure 1:
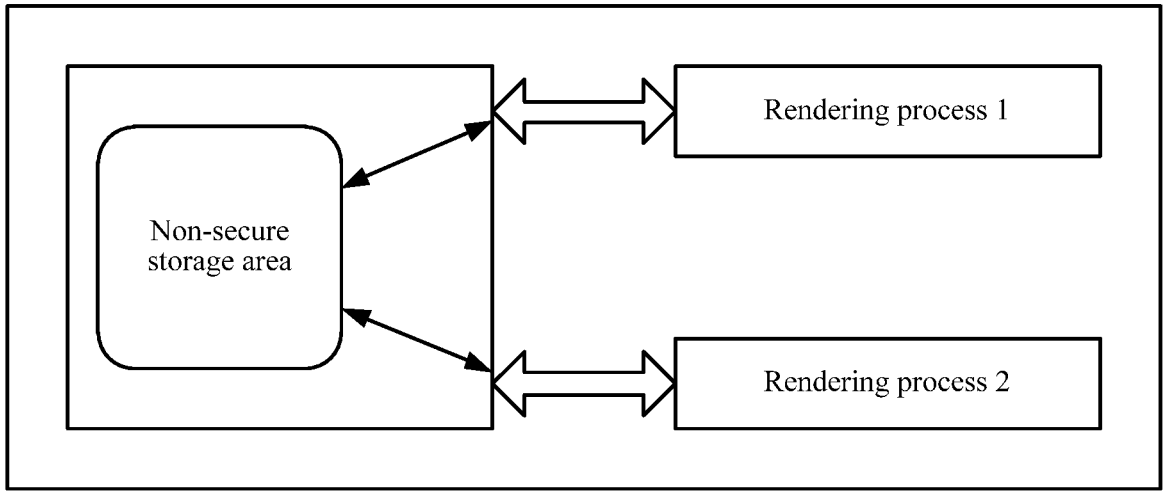
FIG. 1 is a schematic diagram of a process storage model according to an embodiment of the present disclosure.

Embodiments of the present disclosure provide a method and apparatus for network secure storage, to improve browser security. The method for network secure storage can be applied to a client browser and implemented by a computing terminal having at least a processor and a memory. The client browser may be stored in the memory and executed by the processor. When being run by the processor, the browser may have access to storage areas of the memory. FIG. 1 is a schematic diagram of a process storage model. As shown in FIG. 1, a browser creates only a non-secure storage area for a client. Cache services of all rendering processes in the browser are implemented by using the non-secure storage area. That is, in a rendering process 1 and a rendering process 2 in FIG. 1, data that needs to be stored is stored in the non-secure storage area. However, when a user performs operations on sensitive data by using the client in FIG. 1, caches of some important data are stored in the non-secure storage area. This increases the risk of a web page attack by means of attacking stored data.

To ensure security of operations on sensitive data that are performed by a user, embodiments of the present disclosure provide a technical solution. When it is detected that a client requests to create a window, the window is created, a storage area is created for or allocated correspondingly to the created window. A correspondence between the window and the storage area is established. In addition, a rendering process is created for or allocated correspondingly to the window. The storage area corresponding to the window to which the rendering process corresponds is determined according to the established correspondence. A storage service is provided to the rendering process by using the determined storage area. In embodiments of the present disclosure, storage services may be provided to rendering processes of some windows by different storage areas, so as to perform network secure storage in a same browser. This effectively reduces a risk of a web page attack by means of attacking the stored data.

Figure 2A:
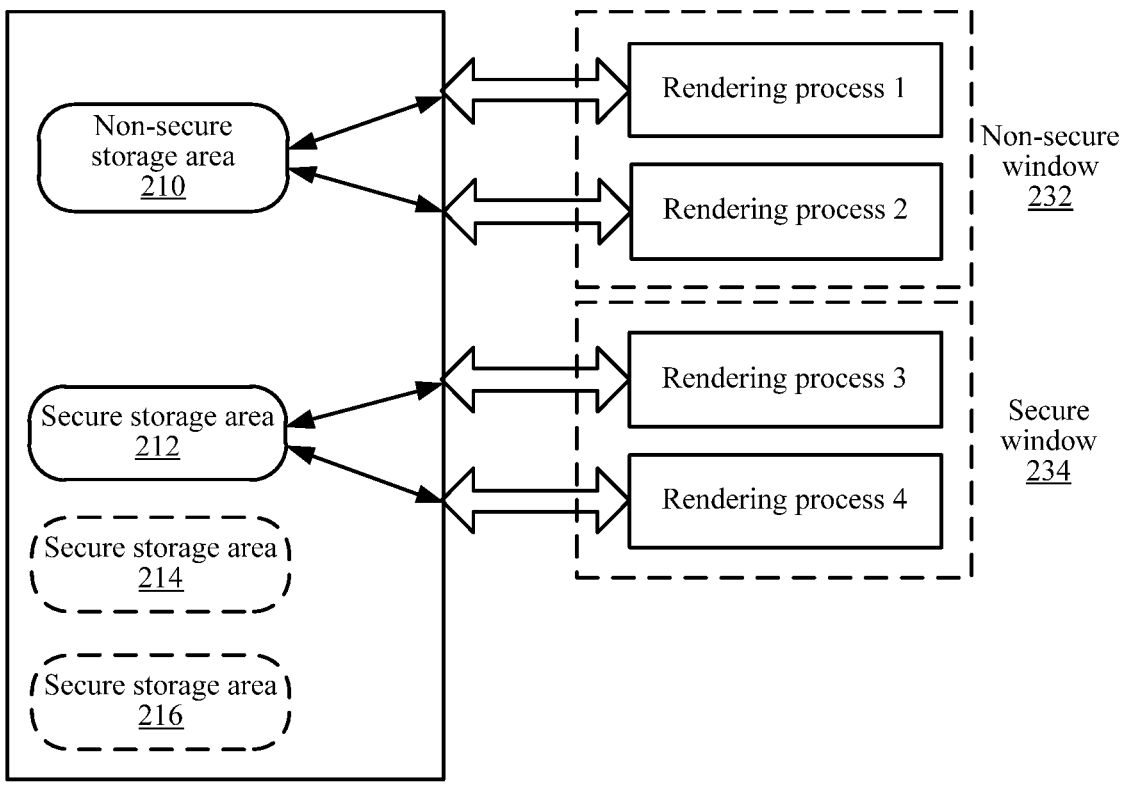
FIG. 2A to FIG. 2C are schematic diagrams of a process storage model according to an embodiment of the present disclosure.

In an example based on the present disclosure, different non-secure windows share a same non-secure storage area, and secure windows and secure storage areas are in one-to-one correspondence. That is, a browser creates only one non-secure storage area, and may create multiple secure storage areas. FIG. 2A is a schematic diagram of a process storage model according to an embodiment of the present disclosure. As shown in FIG. 2A, a browser creates, for a client, a non-secure storage area 210, a secure storage area 212 (and may further create a secure storage area 214, a secure storage area 216, and the like according to actual needs). Storage services of a rendering process 1 and a rendering process 2 that are established in a non-secure window 232 are provided by the non-secure storage area 210. Storage services of a rendering process 3 and a rendering process 4 that are established in a secure window 234 are provided by the secure storage area 212.

Figure 2B:
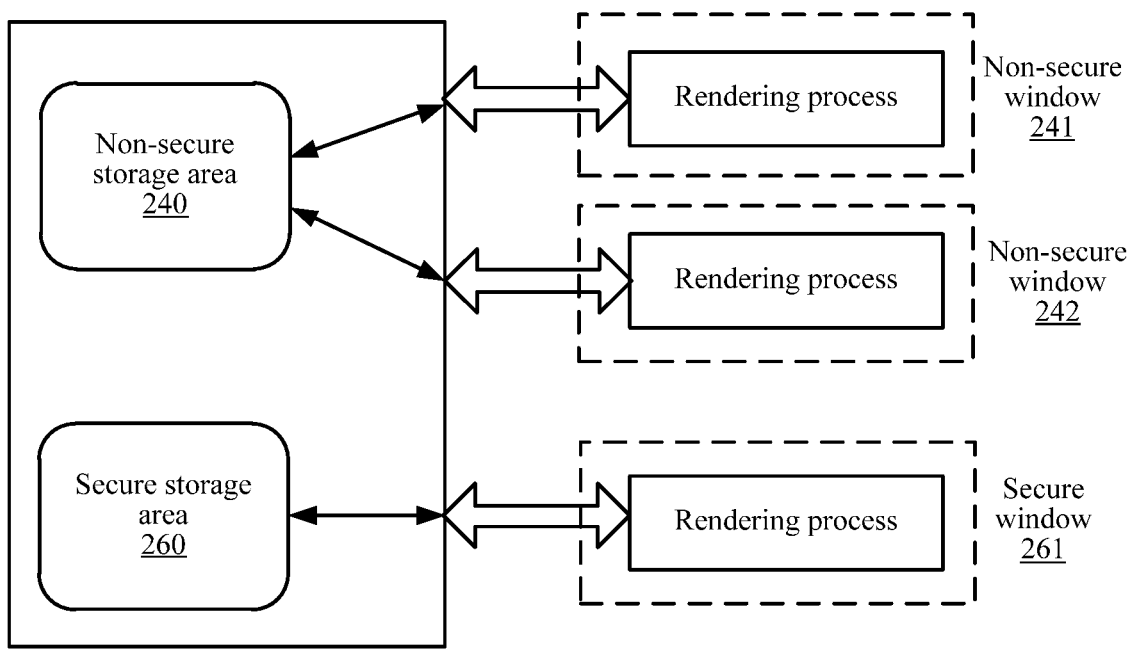

For example, in an embodiment of the present disclosure, referring to FIG. 2B, before browsing news in a web page, a user may request, by means of a client, to create a non-secure window for the first time. Then, a browser creates a non-secure window 241 and a non-secure storage area 240 for the client; creates a rendering process for the non-secure window 241; and stores, in the non-secure storage area 240, all cache data generated when the user browses news in the web page by means of the rendering process. Subsequently, if the user wants, after closing the non-secure window 241 by using the client, to browse a web page in a non-secure window again, the browser creates a new non-secure window 242 for a user terminal. The system may create a rendering process for the new non-secure window 242 or allocates a rendering process created for another non-secure window to the new non-secure window for reuse; and stores, in the previously created non-secure storage area 240, all cache data generated when the user browses a web page by means of the rendering process that is created for or allocated to the new non-secure window 242. When the user wants to perform operations related to an online bank, the user may request, by means of the client, to create a secure window. The browser of the client creates a secure window 261 for the client and a corresponding secure storage area 260, and creates a rendering process for the secure window 261, so that the user stores, by means of the rendering process created for the secure window 261, information such as an account for the online bank in the secure storage area 260.

Figure 2C:
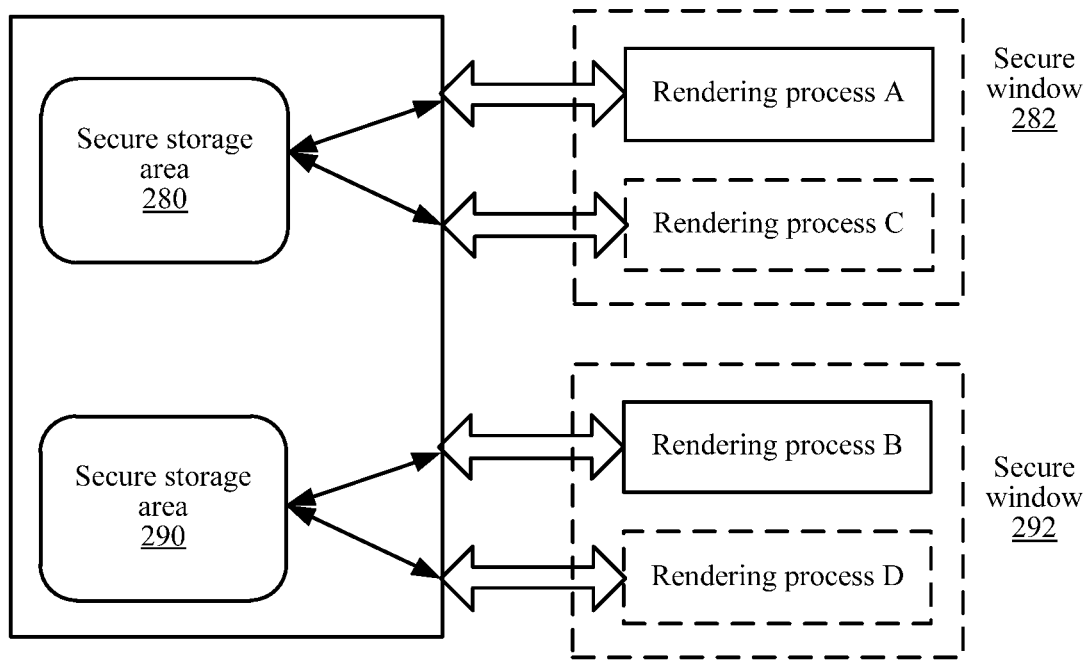

In another example, in another embodiment of the present disclosure, as shown in FIG. 2C, when the user wants to log in two different QQ accounts (for example, QQ1 and QQ2, and the two accounts do not affect each other) in a same client at the same time by means of a browser, the user may request to create two different secure windows. Then a client browser creates a secure window 282 and a secure window 292 for the client, and corresponding secure storage area 280 and secure storage area 290; and creates a rendering process A for the secure window 282, and creates a rendering process B for the secure window 292, so that the user logs in QQ1 by means of the rendering process A created for the secure window 282, and stores related information in the secure storage area 280; and logs in QQ2 by means of the rendering process B created for the secure window 292, and stores related information in the secure storage area 290. Alternatively, the secure window 282 may reuse a rendering process C, the secure window 292 may reuse a rendering process D, and the rendering process C. The rendering processes are respectively created previously by the browser for two different secure windows (the two different secure windows are not the non-secure window 282, and are not the non-secure window 292). The user logs in QQ1 by means of the rendering process C that is reused by the secure window 282, and stores related information in the secure storage area 280; and logs in QQ2 by means of the rendering process D that is reused by the secure window 292, and stores related information in the secure storage area 290. In this way, logging in multiple QQ accounts in a browser at the same time can be implemented, and security of data related to the multiple QQ accounts can be ensured.

According to FIG. 2A to FIG. 2C, a secure storage area may be isolated from a non-secure storage area. From the non-secure storage area, the secure storage area cannot be seen. Only a rendering process of a secure window corresponding to the secure storage area can access data in the secure storage, and other rendering processes of a non-secure window or other secure windows have no right to access data in the secure storage area. Therefore, the embodiments of the present disclosure improves security of data in a secure storage area.

Figure 3:
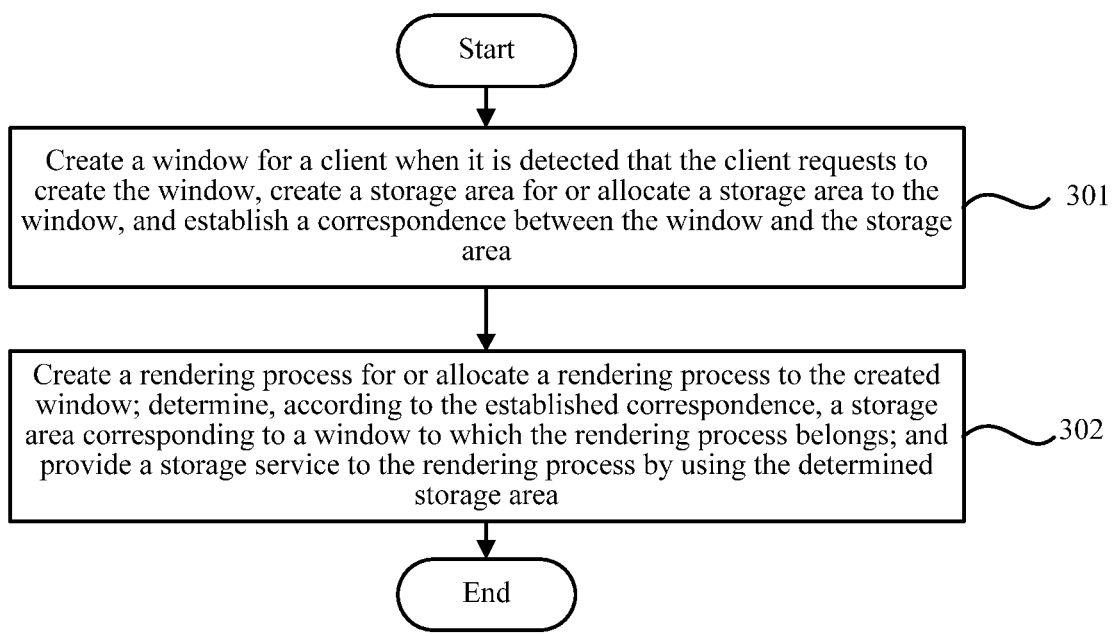
FIG. 3 is a flowchart of a method for network secure storage according to an embodiment of the present disclosure.

FIG. 3 is a flowchart of a method for network secure storage according to an embodiment of the present disclosure. As shown in FIG. 3, one embodiment of the present disclosure is applied to a client browser. The client is a terminal device having a data computing and processing function, and includes but is not limited to (a device provided with a communications module) a smartphone, a palmtop computer, a tablet computer, a smart TV, a personal PC, and the like. An operating system is installed in the communications terminals, and includes but is not limited to Android, Symbian, Windows mobile, Apple's iPhone OS, and the like.

This embodiment of the present disclosure includes the following steps.

Step 301: Create a window for a client when it is detected that the client requests to create the window, create a storage area for or allocate a storage area to the window, and establish a correspondence between the window and the storage area.

In one example, the window which the client requests to create in this step is divided into two types of windows: a secure window and a non-secure window.

When the created window is a secure window, a secure storage area matching the secure window is created, and a correspondence between the matching secure storage area and the secure window is established. When the created window is a non-secure window, if it is the first time for the client to request to create a non-secure window, a non-secure storage area is created for the non-secure window created for the first time, and a correspondence between the non-secure window created for the first time and the current created non-secure storage area is established. If it is not the first time for the client to request to create a non-secure window, the non-secure window is allocated correspondingly to a non-secure storage area that has been created, and a correspondence between the non-secure window that is not created for the first time and the non-secure storage area that has been created is established.

In one example, the establishing a correspondence between the window and the storage area may specifically include allocating a window attribute value in one-to-one correspondence to the created window; and storing, in a window storage list, a correspondence between the window attribute value and an identifier of the storage area that is created for or allocated correspondingly to the window.

Table 1 is an example of a window storage list. As shown in Table 1, when the window attribute value is 0, a non-secure storage area is matching. When the window attribute value is 1, a secure storage area 1 is matching. When the window attribute value is 2, a secure storage area 2 is matching. That is, in a non-secure window whose window attribute value is 0, data of all rendering processes that needs to be stored is all stored in the non-secure storage area; in a secure window whose window attribute value is 1, data of all rendering processes that needs to be stored is all stored in the secure storage area 1; and in a secure window whose window attribute value is 2, data of all rendering processes that needs to be stored is all stored in the secure storage area 2.

TABLE 1

| Window attribute value | Storage area |
| --- | --- |
| 0 | Non-secure storage area |
| 1 | Secure storage area 1 |
| 2 | Secure storage area 2 |

Step 302: Create a rendering process for or allocate a rendering process to the created window; determine, according to the established correspondence, a storage area corresponding to a window to which the rendering process belongs; and provide a storage service to the rendering process by using the determined storage area.

In this step, a rendering process is further created for or allocated correspondingly to the window created for the client in step 301. The storage area created for or allocated correspondingly to the window created for the client in step 301 is used to provide a storage service to the rendering process created for or allocated correspondingly to the window in this step.

In one example, in this step, the determining, according to the established correspondence, a storage area corresponding to a window to which the rendering process belongs specifically includes: determining a matching entry in the window storage list according to the window attribute value of the window to which the rendering process belongs; and determining, according to an identifier that is recorded in the matching entry, a storage area corresponding to the window to which the rendering process belongs.

In another example, to effectively use a storage area in the client, when it is detected that the client closes a secure window, a secure storage area corresponding to the secure window closed by the client is determined according to the established correspondence, and the secure storage area is released. The process may specifically include: determining a matching entry in the window storage list according to a window attribute value of the secure window closed by the client; determining, according to an identifier of a storage area that is recorded in the matching entry, a secure storage area corresponding to the secure window closed by the client, and releasing the secure storage area; and deleting the matching entry.

Because a secure window is used for operations on sensitive data, after the secure window is closed after the operations are completed, the system may release a secure storage area corresponding to the secure window can ensure security and benefit of a user, and can make storage space of the client be effectively used. A non-secure storage area provides a service to a rendering process created in a non-secure window. Because operations on insensitive data are performed in the non-secure window, some cache data, a picture, or the like is stored in the client. When the user accesses a browser again, the data stored in the non-secure storage area in the client may provide the user with faster browse experience. Therefore, when the client closes the non-secure window, the non-secure storage area is not released in this embodiment of the present disclosure.

Figure 4:
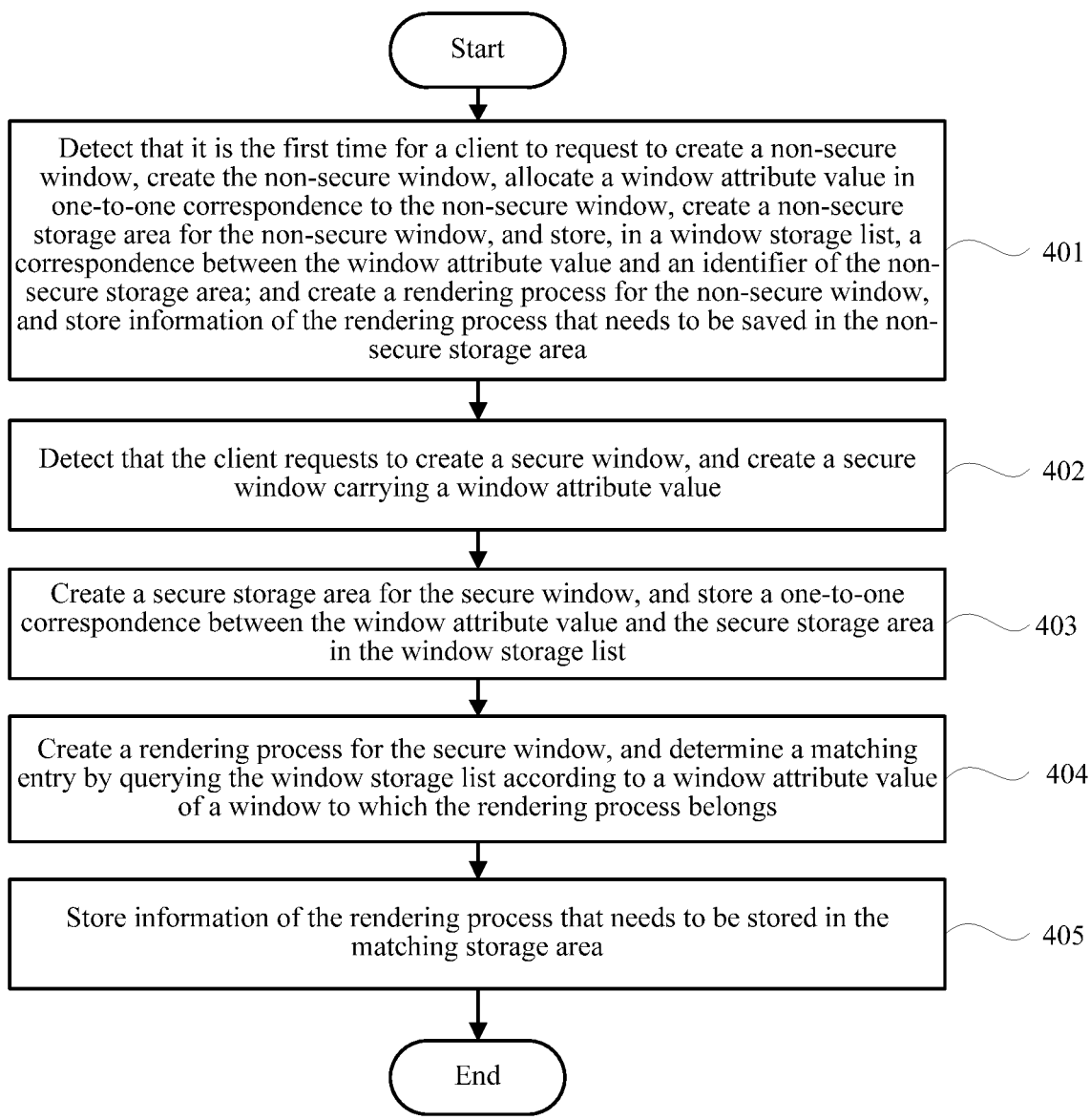
FIG. 4 is a flowchart of a method for network secure storage according to another embodiment of the present disclosure.

FIG. 3 is a flowchart of a method for network secure storage in a browser according to an embodiment of the present disclosure. As shown in FIG. 4, the method includes the following steps.

Step 401: Detect that it is the first time for a client to request to create a non-secure window. They system may then create the non-secure window, allocate a window attribute value in one-to-one correspondence to the non-secure window, create a non-secure storage area for the non-secure window, and store, in a window storage list, a correspondence between the window attribute value and an identifier of the non-secure storage area; and create a rendering process for the non-secure window, and store information of the rendering process that needs to be saved in the non-secure storage area.

In this step, if it is detected that it is the first time for the client to request to create a non-secure window, the non-secure window is created, a window attribute value in one-to-one correspondence to the non-secure window is allocated, create a corresponding non-secure storage area for the non-secure window, and a correspondence between the non-secure window attribute value and the non-secure storage area is stored in a window storage list. It is assumed that an attribute value of the non-secure window created in this step is 0, the window storage list is shown in Table 2.

TABLE 2

| Window attribute value | Storage area |
| --- | --- |
| 0 | Non-secure storage area |

Each client browser creates a non-secure storage area only when a client requests to create a non-secure window for the first time. Subsequently, when it is detected again that the client requests to create a non-secure window, the non-secure storage area that has been created is allocated to the non-secure window created for the second time, and is used to provide a storage service to a rendering process that is created for the non-secure window created for the second time. That is, all non-secure windows in the client share a same non-secure storage area.

Step 402: Detect that the client requests to create a secure window, and create a secure window carrying a window attribute value.

In this step, it is detected that the client requests to create a secure window, and a secure window carrying a window attribute value is created for the client, and the secure window is presented to the client. It is assumed that the window attribute value that is allocated to the secure window created for the client is 5.

Step 403: Create a secure storage area for the secure window, and store a one-to-one correspondence between the window attribute value and the secure storage area in the window storage list.

In this step, after a secure window is created for the client, a matching secure storage area is created for the created secure window, and a one-to-one correspondence between the window attribute value of the secure window and the secure storage area in the window storage list. The window storage list is shown in Table 3.

TABLE 3

| Window attribute value | Storage area |
| --- | --- |
| 0 | Non-secure storage area |
| 5 | Secure storage area 1 |

Step 404: Create a rendering process for the secure window, and determine a matching entry by querying the window storage list according to a window attribute value of a window to which the rendering process belongs.

In this step, a rendering process is further created for the secure window, and a matching entry is determined by querying the storage list according to a window attribute value of a window to which the rendering process belongs. Each rendering process belongs to a window, and each window has only one window attribute value. Therefore, a matching entry in the window storage list may be determined according to a window attribute value, and further a storage area corresponding to the rendering process is determined.

In this step, it is assumed that a rendering process is created for a secure window 5, a window attribute value of a window to which the rendering process belongs is 5. Table 3 is queried according to that the window attribute value is 5. An obtained matching entry is shown in Table 4.

TABLE 4

| 5 | Secure storage area 1 |
| --- | --- |

Step 405: Store information of the rendering process that needs to be saved in the matching storage area.

In this step, as shown in Table 4, information of the rendering process that needs to be stored is saved in the matching storage area. That is, all stored data of the rendering process created in step 404 is stored in the secure storage area 1.

In this embodiment, a scenario in which a client creates a secure window may be a scenario of online shopping or an operation in an online bank that relates to money, so that sensitive data is stored in a secure storage area different from a non-secure storage area, thereby preventing a CSRF attack by using cookies, a cache timing attack by using caches, or the like; or may be a scenario of logging in different accounts of a same application, for example, logging in different QQ accounts, different mailboxes, different Weibo accounts, different game accounts, and the like at a same time in a web page. In embodiments of the present disclosure, network secure storage is implemented. Therefore, storage data generated by rendering processes of different secure windows may be isolated, and does not affect each other.

Figure 5:
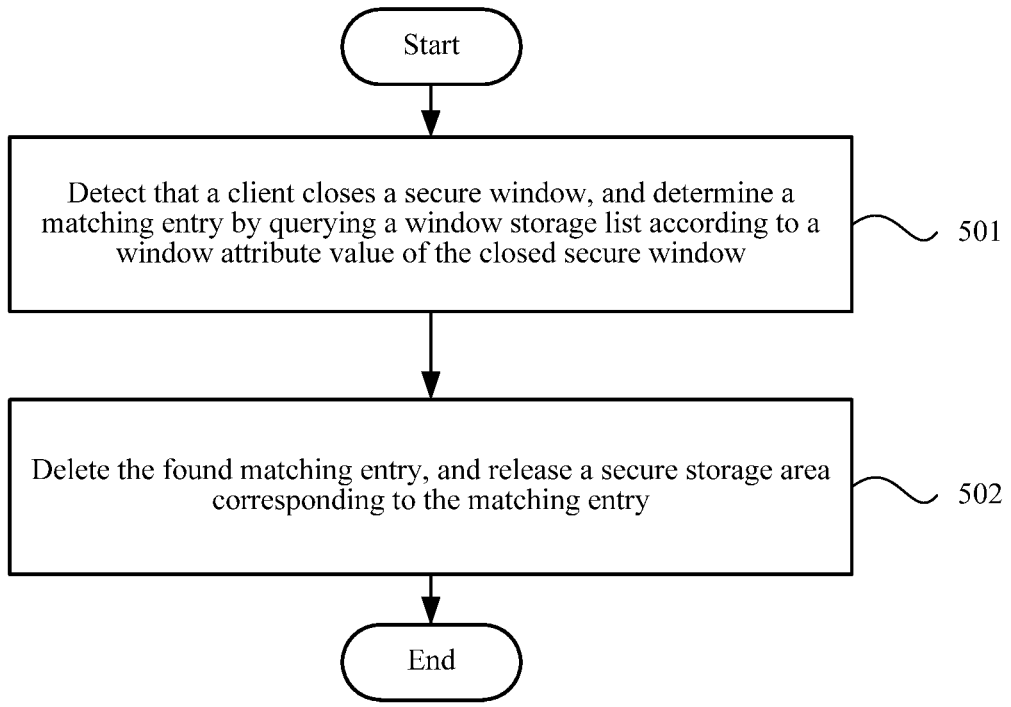
FIG. 5 is a flowchart of a method for network secure storage according to another embodiment of the present disclosure.

FIG. 5 is a flowchart of a method for network secure storage in a browser according to an embodiment of the present disclosure. As shown in FIG. 5, the method includes the following steps.

Step 501: Detect that a client closes a secure window, and determine a matching entry by querying a window storage list according to a window attribute value of the closed secure window.

In this step, it is assumed that the client closes a secure window whose window attribute value is 5. A matching entry is determined by querying the window storage list shown in Table 5 according to the window attribute value. It is assumed that the determined matching entry is shown in Table 6.

TABLE 5

| Window attribute value | Storage area |
| --- | --- |
| 0 | Non-secure storage area |
| 1 | Secure storage area 1 |
| 2 | Secure storage area 2 |
| 5 | Secure storage area 3 |

TABLE 6

| 5 | Secure storage area 3 |
| --- | --- |

Step 502: Delete the found matching entry, and release a secure storage area corresponding to the matching entry.

To save storage space of the client, the matching entry determined in step 501 is deleted, a secure storage area 3 corresponding to the matching entry is released, and data stored in the secure storage area 3 that is previously created for the secure window whose window attribute value is 5 is deleted.

In this embodiment, a secure storage area that is occupied by an ineffective secure window is released, so as to clean storage space of the client in time, thereby improving storage space utilization.

Figure 6:
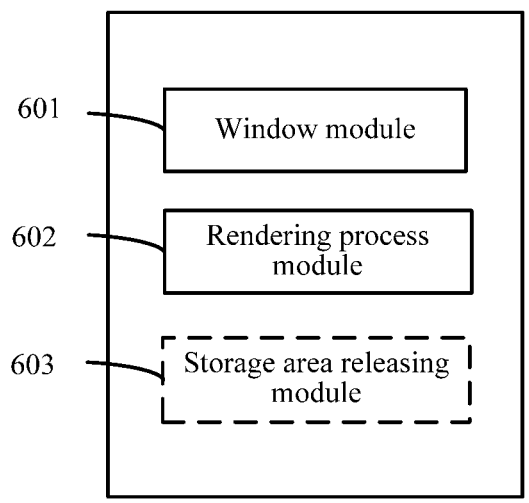
FIG. 6 is a structural diagram of an apparatus for implementing network security storage according to an embodiment of the present disclosure.

FIG. 6 is a schematic structural diagram of an apparatus for implementing network security storage according to an embodiment of the present disclosure. As shown in FIG. 6, the apparatus includes the following modules. The apparatus includes a window module 601, configured to: create a window for a client when it is detected that the client requests to create the window; create a storage area for or allocate a storage area to the window; and establish a correspondence between the window and the storage area. The apparatus includes a rendering process module 602, configured to: create a rendering process for or allocate a rendering process to the window; determine, according to the established correspondence, a storage area corresponding to a window to which the rendering process belongs; and provide a storage service to the rendering process by using the determined storage area.

In some embodiments, the window module 601 is further configured to: when the created window is a secure window, create a secure storage area matching the secure window; establish a correspondence between the secure window and the matching secure storage area; create a rendering process in the secure window, so that the matching secure storage area provides, by means of the correspondence, a storage service to the rendering process that is created in the secure window; and when the created window is a non-secure window, create a rendering process for or allocate a rendering process to the non-secure window; and if it is the first time for the client to request to create a non-secure window, create a non-secure storage area for the non-secure window created for the first time, and establish a correspondence between the non-secure window created for the first time and the current created non-secure storage area; or if it is not the first time for the client to request to create a non-secure window, allocate the non-secure window that is not created for the first time to a non-secure storage area that has been created, and establish a correspondence between the non-secure window that is not created for the first time and the non-secure storage area that has been created, where the non-secure storage area provides storage services to all rendering processes created for non-secure windows.

In some embodiments, the window module 601 is further configured to: allocate a window attribute value in one-to-one correspondence to the created window; and store, in a window storage list, a correspondence between the window attribute value and an identifier of the storage area that is created for or allocated correspondingly to the window.

In some embodiments, the rendering process module 602 is further configured to: determine a matching entry in the window storage list according to a window attribute value of a window to which the rendering process belongs; and determine, according to an identifier that is recorded in the matching entry, a storage area corresponding to the window to which the rendering process belongs.

In some embodiments, the apparatus further includes a storage area releasing module 603, configured to: when it is detected that the client closes the secure window, determine, according to the established correspondence, a secure storage area corresponding to the secure window closed by the client, and release the secure storage area.

In some embodiments, the storage area releasing module 603 is further configured to: determine a matching entry in the window storage list according to a window attribute value of the secure window closed by the client; determine, according to an identifier of a storage area that is recorded in the matching entry, a secure storage area corresponding to the secure window closed by the client, and release the secure storage area; and delete the matching entry.

Figure 7:
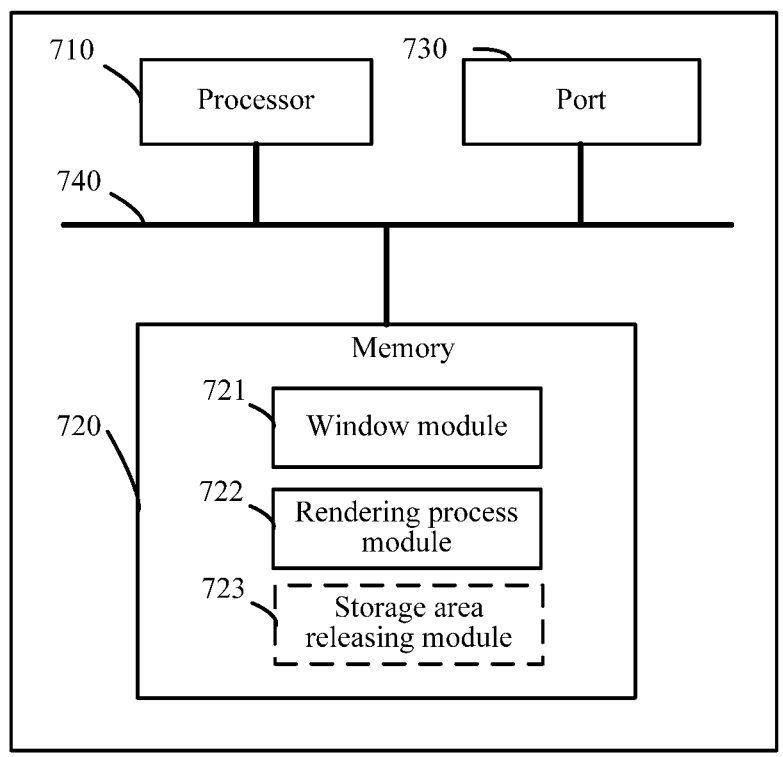
FIG. 7 is a schematic component diagram of an apparatus for implementing network secure storage according to an embodiment of the present disclosure.

FIG. 7 is a schematic diagram of a hardware structure of an apparatus for implementing network secure storage according to an embodiment of the present disclosure. The apparatus for implementing network secure storage may include a processor 710, a memory 720, a port 730, and a bus 740. The processor 710 and the memory 720 are connected to each other by means of the bus 740. The processor 710 may receive and send data by means of the port 730. In some embodiments, the components of the apparatus for implementing network secure storage may be included in a client terminal, such as a desktop computer, a smartphone, or other smartdevices.

The processor 710 is configured to execute a machine readable instruction module stored in the memory 720. The memory 720 may include a non-transitory computer-readable storage medium containing computer-executable program for, when being executed by the processor 710, implementing the disclosed secure storage method.

The memory 720 stores the machine readable instruction module that can be executed by the processor 710. The machine readable instruction module includes a window module 721 and a rendering process module 722. In some embodiments, the memory 720 may include storage areas, a storage area releasing module 723. When the processor 710 executes instructions in the window module 721, the rendering process module 722, and the storage area releasing module 723, various functions of the window module 721, the rendering process module 722, and the storage area releasing module 723 may be separately implemented. Exemplary operations of the window module 721, the rendering process module 722, the releasing module 723, are described in relation to FIG. 6 above.

According to the method and apparatus provided in the embodiments of the present disclosure, when a window is created for a client, a storage area is created for or allocated correspondingly to the window, and a correspondence between the window and the storage area is recorded. Different storage areas may provide storage services to rendering processes of some windows, thereby performing network secure storage in a same browser. Therefore, when a user needs to perform operations on sensitive data, a created window may correspond to an independent storage area, thereby effectively preventing an attack performed by using data stored in a browser, and providing the user with a more secure and more stable browse experience environment.

For specific implementations of the apparatus for implementing network secure storage, please also refer to the method embodiments described in relation to FIGS. 2-5 for details, and the details are not repeated herein.

In addition, functional modules in the embodiments of the present disclosure may be integrated into one processing unit, or each of the modules may exist alone physically, or two or more modules are integrated into one unit. The integrated unit may be implemented in a form of hardware, or may be implemented in a form of a software functional unit.

In addition, each embodiment of the present disclosure may be implemented by a data processing program that is executed by a data processing device such as a computer. Apparently, the data processing program constitutes this application. In addition, generally a data processing program stored in a storage medium is executed by directly reading the program from the storage medium or by installing or copying the program to a storage device (such as a hard disk or memory) of a data processing device. Therefore, such a storage medium also constitutes this application. The storage medium may use any type of recording, for example, a paper storage medium (such as a paper tape), a magnetic storage medium (such as a floppy disk, a hard disk, or a flash memory), an optical storage medium (such as a CD-ROM), or a magneto-optical storage medium (such as an MO).

Therefore, this application further discloses a storage medium, having a data processing program stored therein, the data processing program being used to perform any one of the embodiments of the method in the present disclosure.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely preferred embodiments of the present disclosure, but are not intended to limit this application. Any modification, equivalent replacement, and improvement made without departing from the spirit and principle of the present disclosure shall fall within the protection scope of this application.

What is claimed is:

1. A secure storage method for a network, applied to a client browser and implemented by a computing terminal having at least a processor and a memory, the method comprising:
receiving a plurality of client requests for creating a plurality of windows, each client request being a request to create one of the plurality of windows associated with the client request, the plurality of windows including a plurality of secure windows; and when the client request is a secure window creation request, for each client request directed to a same website:

creating the secure window in response to the client request;

creating a window attribute value having a one-to-one correspondence with the secure window;

allocating a separate secure storage area for the secure window for the same website;

assigning a corresponding identifier to the secure storage area;

storing, in a window storage list for each client request for creating a secure window, a one-to-one correspondence between the corresponding identifier of secure storage area and the window attribute value;

allocating a separate rendering process to the secure window to the same website; and providing, to the rendering process corresponding to the secure window, a storage service using the allocated secure storage area, wherein a first rendering process corresponding to a first secure window has access to a first allocated secure storage area, and has no right to access a second allocated secure storage area corresponding to a second secure window;

when the client request is a non-secure window creation request, creating a new non-secure window in response to the client request;

reusing a third rendering process previously created for another non-secure window to the new non-secure window; and using a shared and previously-created unsecure storage area to provide storage service to the third rendering process corresponding to the new non-secure window.

2. The method according to claim 1, further comprising:
for at least one of the plurality of secure windows:
receiving a request to close the secure window;
identifying, the secure storage area corresponding to the secure window; and
releasing the secure storage area.

3. The method according to claim 2, further comprising:
for the at least one of the plurality of secure windows:
determining the matching entry in the window storage list according to the window attribute value of the secure window;
determining, according to the identifier that is recorded in the matching entry, the secure storage area corresponding to the secure window;
releasing the secure storage area; and
deleting the matching entry in the window storage list.

4. The method according to claim 1, further comprising:
for each of the plurality of secure windows, providing a user login to the same website by the allocated rendering process.

5. The method according to claim 1, wherein for each secure window, providing a storage service using the allocated secure storage area to the rendering process comprises:
determining a matching entry in the window storage list according to the window attribute value of the secure window;
determining, according to the identifier that is recorded in the matching entry, the secure storage area corresponding to the secure window; and storing data generated by the rendering process corresponding to the secure window in the secure storage area.

6. The method according to claim 1, further comprising:
in response to receiving the non-secure window creation client request for a first time, allocating the shared non-secure storage area.

7. The method according to claim 1, wherein:
the third rendering process corresponding to the non-secure window has no right to access any allocated secure storage area associated with secure windows.

8. An apparatus for implementing secure storage for a network, comprising:
a memory,
a processor coupled to the memory,
program modules stored in the memory to be executed by the processor, the program modules comprising:
a window module, configured to:
receiving a plurality of client requests for creating a plurality of windows, the plurality of windows including a plurality of secure windows;
when the client request is a secure window creation request, for each client request directed to a same website:
create a window attribute value having a one-to-one correspondence with the secure window;
allocating a separate secure storage area for the secure window for the same website;
assign a corresponding identifier to the secure storage area;
store, in a window storage list for each client request for creating a secure window, a one-to-one correspondence between the corresponding identifier of secure storage area and the window attribute value; and
when the client request is a non-secure window creation request, creating a new non-secure window in response to the client request; and
a rendering process module, configured to:
for each secure window:
allocate a separate rendering process corresponding to the secure window to the same web site; and
provide a storage service to the rendering process corresponding to the secure window by using the allocated secure storage area, wherein a first rendering process corresponding to a first secure window has access to a first allocated secure storage area, and has no right to access a second allocated secure storage area corresponding to a second secure window; and
for the new non-secure window:
reuse a third rendering process previously created for another non-secure window to the new non-secure window; and
use a shared and previously-created unsecure storage area to provide storage service to the third rendering process corresponding to the new non-secure window.

9. The apparatus according to claim 8, wherein the apparatus further comprises a storage area releasing module, configured to:
for at least one of the plurality of secure windows, when the secure window is closed, identify the secure storage area corresponding to the secure window being closed, and release the secure storage area.

10. The apparatus according to claim 9, wherein
the storage area releasing module is further configured to:

for the at least one of the plurality of secure windows:
    determine the matching entry in the window storage list according to the window attribute value of the secure window;
    identify, according to the identifier of that is recorded in the matching entry, the secure storage area corresponding to the secure window;
    release the secure storage area; and
    delete the matching entry.

11. The apparatus according to claim 8, wherein the window module is further configured to:
for each secure window:
    determine a matching entry in the window storage list according to the window attribute value of the secure window;
    determine, according to the identifier that is recorded in the matching entry, the secure storage area corresponding to the secure window; and
    store data generated by the rendering process corresponding to the secure window in the secure storage area.

12. The apparatus according to claim 8, wherein the window module is further configured to:
in response to receiving the non-secure window creation client request for a first time, allocate the shared non-secure storage area.

13. The apparatus according to claim 8, wherein
the third rendering process corresponding to the non-secure window has no right to access any allocated secure storage area associated with secure windows.

14. A non-transitory computer-readable storage medium containing computer-executable program for, when being executed by a processor, implementing a secure storage method, the method comprising:
receiving a plurality of client requests for creating a plurality of windows, each client request being a request to create one of the plurality of windows associated with the client request, the plurality of windows including a plurality of secure windows; and
when the client request is a secure window creation request, for each client request directed to a same web site:
    creating the secure window in response to the client request;
    creating a window attribute value having a one-to-one correspondence with the secure window;
    allocating a separate secure storage area for the secure window for the same web site;
    assigning a corresponding identifier to the secure storage area;
    storing, in a window storage list for each client request for creating a secure window, a one-to-one correspondence between the corresponding identifier of secure storage area and the window attribute value;
    allocating a separate rendering process to the secure window to the same website; and
    providing, to the rendering process corresponding to the secure window, a storage service using the allocated secure storage area, wherein a first rendering process corresponding to a first secure window has access to a first allocated secure storage area, and has no right to access a second allocated secure storage area corresponding to a second secure window;
when the client request is a non-secure window creation request,
    creating a new non-secure window in response to the client request;
    reusing a third rendering process previously created for another non-secure window to the new non-secure window; and
    using a shared and previously-created unsecure storage area to provide storage service to the third rendering process corresponding to the new non-secure window.

15. The storage medium according to claim 14, wherein the method further comprises:
for at least one of the plurality of secure windows:
    receiving a request to close the secure window;
    identifying, the secure storage area corresponding to the secure window; and
    releasing the secure storage area.

16. The storage medium according to claim 15, wherein the method further comprises:
for the at least one of the plurality of secure windows:
    determining the matching entry in the window storage list according to the window attribute value of the secure window;
    determining, according to the identifier that is recorded in the matching entry, the secure storage area corresponding to the secure window;
    releasing the secure storage area; and
    deleting the matching entry in the window storage list.

17. The storage medium according to claim 14, wherein the method further comprises:
determining a matching entry in the window storage list according to the window attribute value of the secure window;
determining, according to the identifier that is recorded in the matching entry, the secure storage area corresponding to the secure window; and
storing data generated by the rendering process corresponding to the secure window in the secure storage area.

18. The storage medium according to claim 14, wherein the method further comprises:
in response to receiving the non-secure window creation client request for a first time, allocating the shared non-secure storage area.

19. The storage medium according to claim 14, wherein:
the third rendering process corresponding to the non-secure window has no right to access any allocated secure storage area associated with secure windows.

* * * * *